United States Patent [19]

Ogura

[11] Patent Number: 5,212,562
[45] Date of Patent: May 18, 1993

[54] IMAGE SIGNAL REPRODUCING APPARATUS HAVING MEMORY FUNCTION

[75] Inventor: Tokihiko Ogura, Kanagawa, Japan

[73] Assignee: Canon Kabushiki Kaisha, Tokyo, Japan

[21] Appl. No.: 557,145

[22] Filed: Jul. 23, 1990

[30] Foreign Application Priority Data

Jul. 25, 1989 [JP] Japan .................................. 1-193091
Jul. 25, 1989 [JP] Japan .................................. 1-193092

[51] Int. Cl.$^5$ ............................................. H04N 5/95
[52] U.S. Cl. .................................... 358/338; 358/323; 358/337; 358/322; 358/342
[58] Field of Search ............... 358/323, 338, 336, 339, 358/335, 342, 310, 320, 322, 328, 907, 337; 360/36.1, 36.2, 27, 78.14; 369/47, 48, 50, 49

[56] References Cited

U.S. PATENT DOCUMENTS 4,672,470  6/1987  Morimoto et al. .................. 358/323

5,062,005 10/1991  Kitaura et al. ...................... 358/392

Primary Examiner—Tommy P. Chin
Assistant Examiner—Robert Chevalier
Attorney, Agent, or Firm—Robin, Blecker, Daley & Driscoll

[57] ABSTRACT

Disclosed is an image signal reproducing apparatus for reproducing an image signal from a recording medium on which is recorded the image signal with a frequency-multiplexed pilot signal When the image signal reproduced from the recording medium is stored, the operation of storing the reproduced image signal is conducted by using a clock signal which defines a timing in which the reproduced image signal is stored. The clock signal is a signal whose phase is synchronized with that of the pilot signal reproduced from the recording medium and then corrected. In consequence, the reproduced image signal can be stored with a high degree of accuracy without being affected by the phase difference between the reproduced image signal and the reproduced pilot signal.

8 Claims, 7 Drawing Sheets

FIRST IMAGE SENSOR SECOND IMAGE SENSOR

IMAGE SIGNAL REPRODUCING APPARATUS HAVING MEMORY FUNCTION

BACKGROUND OF THE INVENTION

1. Field of the Invention

This invention relates to an apparatus for reproducing an image signal recorded on a recording medium.

2. Description of the Related Art

Conventional systems for recording an image signal on recording media include an electronic still video system.

In this electronic still video system, a still image signal recorded on a magnetic disk, called a video floppy disk, is reproduced and displayed on a TV monitor or printed out by a video printer.

In the electronic still video system, the resolution of the still image recorded on the video floppy disk is dependent on the number of pixels of an image sensor (e.g., a charge-coupled device of the like) of a video camera unit used to generate the still image signal.

That is, the horizontal resolution of the still image signal is determined by the number of horizontal pixels of the image sensor whereas the vertical resolution is determined by the number of scanning lines defined by a current TV signal method (e.g., the NISC method).

Accordingly, it has been proposed to improve the resolution by employing two image sensors, each having 500 pixels in the vertical direction and 1200 pixels in the horizontal direction. In this system, the two image sensors are disposed at positions which are shifted from each other in the vertical direction by a distance corresponding to one half pixel relative to an optical image to be formed, and the image signals respectively produced by these image sensors are used to generate a high-resolution still image signal. The generated still image signal is recorded on the recording medium, and the recorded still image signal is reproduced.

Figure 1:
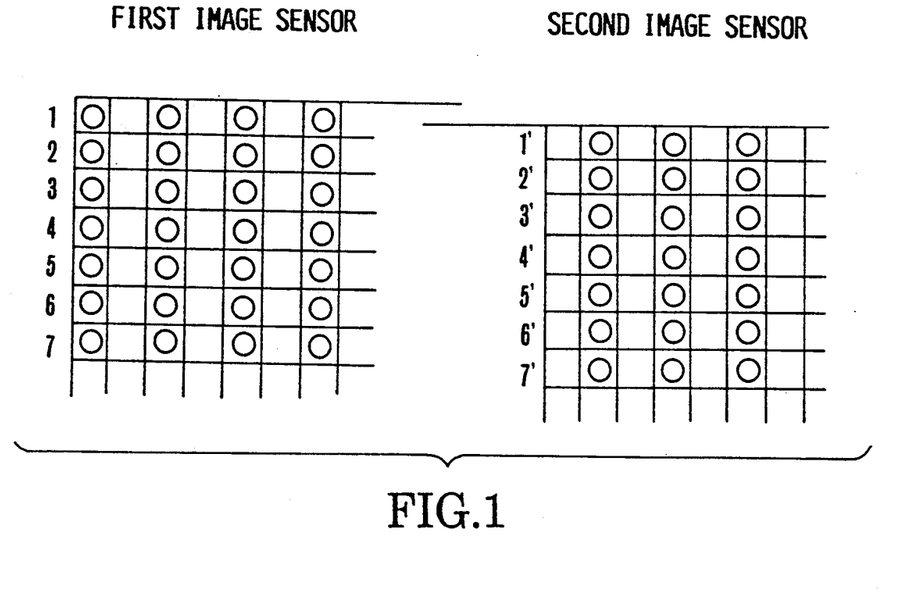
FIG. 1 shows the positional relation between the pixels on image sensing planes of two image sensors employed in an electronic still video system.

FIG. 1 shows the positional relationship between the pixels of the first and second image sensors employed in the above-described system.

Sampling is conducted on the pixels indicated by o in FIG. 1 in the image signals output from the respective image sensors, and the sample image signal is recorded on the video floppy disk by using a two-channel magnetic head to form four tracks.

Figure 2:
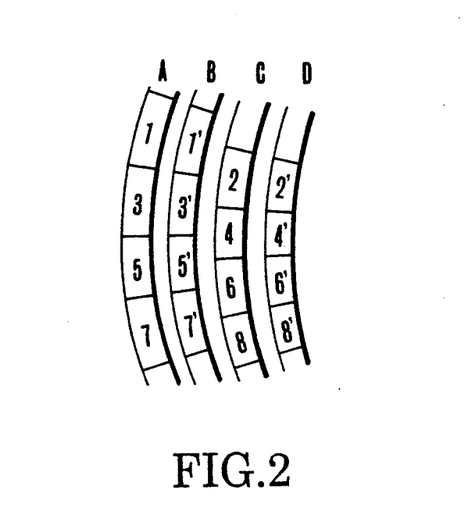
FIG. 2 shows a recording track pattern formed on a video floppy disk in the electronic still video system.

FIG. 2 shows the recording pattern of the four tracks formed on the video floppy disk. In this pattern, the image signal output from the first image sensor is recorded on tracks A and C, and the image signal output from the second image sensor is recorded on tracks B and D.

For reproduction, the image signal recorded on the four tracks on the video floppy disk in the abovedescribed manner is reproduced, the reproduced image signal is reconstructed in a memory, and interpolation is then conducted on the reconstructed image signal to generate a still image signal, having a horizontal resolution of 1200 pixels and a vertical resolution of 1000 pixels. Thereafter, the generated still image signal will be supplied to a TV monitor or a video printer to display or print out a high-resolution still image.

A transmission system, in which part of the image signals output from the image sensors is extracted, in which the extracted signal is recorded on the video floppy disk and in which the signals reproduced from the video floppy disk are reconstructed in the memory, as in the case of the above-described s).stem, constitutes one type of analog transmission of a sampled value. In such a transmission system, the total amplitude and phase characteristics must be strictly controlled, and time base variations generated in the recording and reproduction system must be accurately corrected in order to conduct re-sampling of the reproduced image signal when the reproduced image signal is reconstructed.

Figure 3:
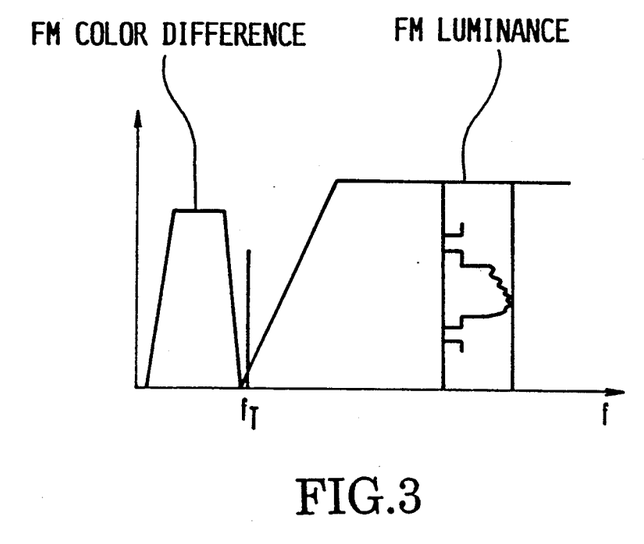
FIG. 3 shows the frequency allocation of a pilot signal in the electronic still video system.

It has accordingly been proposed to correct the time base variations in the manner described below: during recording, a time base correcting pilot signal is frequency-multiplexed with the image signal between a color-difference frequency-modulated signal band and a luminance frequency-modulated signal band, as shown in FIG. 3. During reproduction, a sampling clock signal having the same jitter component as that of the reproduced pilot signal is formed, and the reproduced image signal is sampled and then stored temporarily in the memory or the like by using that sampling clock signal. Thereafter, the stored image signal is read out by using a clock signal having no time base variations.

However, in the above-described electronic still video system, since the image signal wi&h which the pilot signal is frequency-multiplexed is recorded on the video floppy disk while it is rotating at a predetermined rotational speed, the recording wavelength for the outer circumference tracks on the video floppy disk varies from that for the inner circumference tracks, so that the phase difference between the reproduced image signal and the reproduced pilot signal, generated due to the non-linear distortion generated in an electromagnetic conversion system constructed by the video floppy disk and the magnetic head, varies depending on the track position.

Thus, even if the time base variations are corrected by means of the reproduced pilot signal, since the phase difference varies between the reproduced image signal and the reproduced pilot signal, which is generated on the outer circumference tracks on the video floppy disk, varies from the reproduced signals generated on the inner circumference tracks, sampling cannot be conducted in the reproduction in the same timing in which sampling is conducted during recording. The image signal cannot, therefore, be restored with a high degree of accuracy.

Figures 4A, 4B:
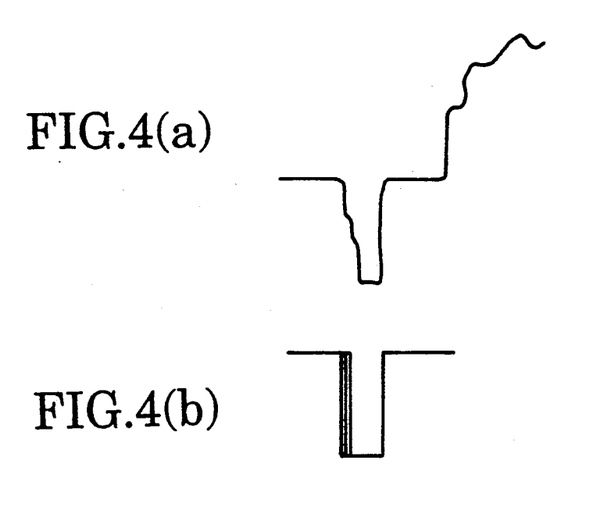
FIGS. 4(a) and 4(b) illustrate the deterioration of the waveform of a horizontal synchronizing signal which occurs during reproduction.

Furthermore, in the above-described electronic still video system, when the frequency-modulated image signal reproduced from the video floppy disk is demodulated and stored in the memory, the horizontal address of the image signal storing memory is generally reset in synchronism with the horizontal and vertical synchronizing signals affixed to the demodulated image signal. However, if waveform distortion occurs in the synchronizing signal portion of the demodulated image signal or if the SN deteriorates, as shown in FIG. 4(a), shaping of the waveform of that portion produces a wave form, the time base of the edge portion of which deteriorates, as shown in FIG. 4(b). In consequence, if that synchronizing signal is used to reset the horizontal address of the image signal storing memory, the image signal will be stored at an address in the memory different from that at which it would be stored during the normal operation. In that case, even if a precise reading-out clock signal is used to read out that image signal stored in the memory in that manner, the restored image is deformed due to that shift of the address, and an original image cannot thus be restored with a high degree of accuracy.

Summary of the Invention

An object of the present invention is to provide an image signal reproducing apparatus which is directed to obviating the aforementioned problems of the prior techniques.

Another object of the present invention is to provide an image signal reproducing apparatus which is capable of storing a reproduced image signal with a high degree of accuracy without being affected by difference in the phase between a reproduced image signal and a reproduced pilot signal.

In order to achieve the aforementioned objects, the present invention provides in one preferred form an image signal reproducing apparatus which reproduces an image signal from a recording medium on which is recorded the image signal frequency-multiplexed with a pilot signal. The image signal reproducing apparatus comprises reproduction means for tracing the recording medium and thereby, reproducing from the recording medium the image signal frequency-multiplexed with the pilot signal; memory means for storing the image signal reproduced from the recording medium by the reproduction means, clock signal generating means for generating a clock signal which defines a timing in which the reproduced image signal is stored in the memory means, the clock signal having a phase synchronized with that of the pilot signal reproduced from the recording medium by the reproduction means, and phase correction means for correcting the phase of the clock signal generated by the clock signal generating means and supplying the corrected clock signal to the memory means.

Another object of the present invention is to provide an image signal reproducing apparatus which is capable of eliminating the time base variations generated in the reproduced image signal with a high degree of accuracy.

In order to achieve the above-described object, the present invention provides in another preferred form an image signal reproducing apparatus which reproduces an image signal from a recording medium on which is recorded the image signal with a frequency-multiplexed pilot signal The image signal reproducing apparatus comprises memory means for storing the image signal reproduced from the recording medium, clock signal generating means for generating a clock signal which defines a timing in which the reproduced image signal is stored in the memory means, the clock signal having a phase synchronized with that of the pilot signal reproduced form the recording medium, synchronizing signal separation means for separating a synchronizing signal from the image signal reproduced from the recording medium and for outputting the separated synchronizing signal, and control means for controlling a storage operation of the memory means in accordance with the clock signal generated by the clock signal generating means and the synchronizing signal separated by the synchronizing signal separation means.

Other objects and features of the present invention will become more apparent from the following description of the preferred embodiments thereof, taken in conjunction with the accompanying drawings.

DETAILED DESCRIPTION OF THE PREFERRED EMBODIMENTS

The present invention will be described in detail by way of example.

Figure 5:
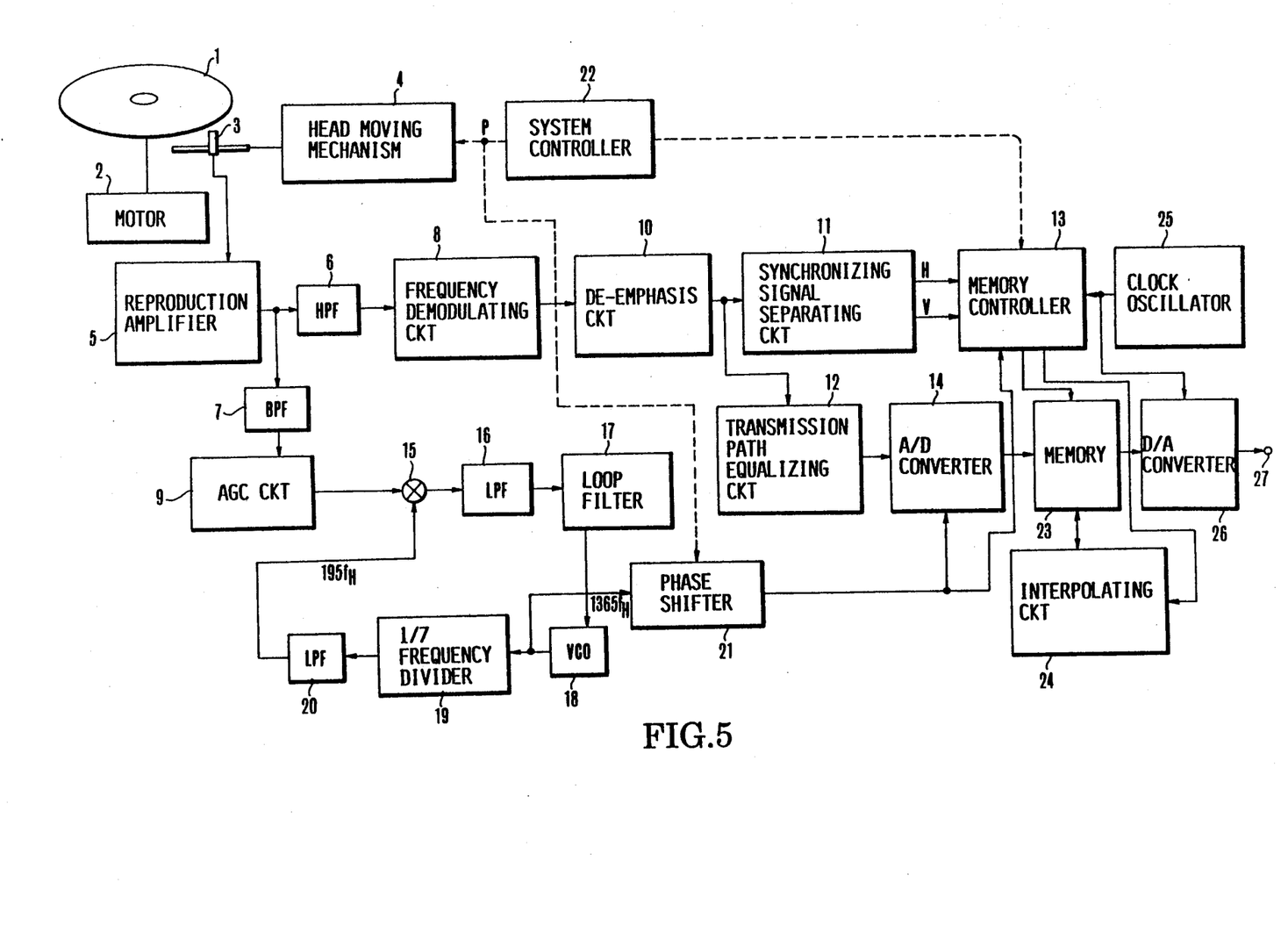
FIG. 5 is a schematic view of a reproducing apparatus for the electronic still video system to which the present invention is applied, showing a first embodiment of the present invention.

FIG. 5 is a schematic view of a reproducing apparatus for an electronic still video system to which the present invention is applied, showing a first embodiment of the present invention. To simplify the explanation, only a luminance signal processing system is shown in FIG. 5, description of a color signal processing system being omitted.

In FIG. 5, a reference numeral 1 denotes a video floppy disk on which fifty recording tracks are formed in a concentric fashion. On these fifty recording tracks, image signals, with which pilot signals are multiplexed in the manner shown in FIG. 3, are recorded in a track pattern shown in FIG. 2. The image signals are transmitted in four fields to form a single picture. The video floppy disk 1 is rotated for reproduction by a motor 2 at a speed of 1/60 sec per rotation.

When a desired track from which information is reproduced is given to a system controller 22 by operating an operation unit (not shown), the system controller 22 outputs a track designating signal P to a head moving mechanism 4, upon which the head moving mechanism 4 moves a magnetic head 3 to a track designated by the track designating signal P. The magnetic head 3 reproduces a signal recorded on the designated track and supplies the reproduced signal to a reproduction amplifier 5.

The reproduction amplifier 5 amplifies the signal reproduced by the magnetic head 3, and supplies the amplified signal to a high-pass filter (HPF) 6 and to a band-pass filter (BPF) 7.

The high-pass filter 6 separates a frequency-modulated luminance signal from the signal supplied from the reproduction amplifier 5, and supplies the separated frequency-modulated luminance signal to a frequency demodulating circuit 8. The band-pass filter 7 separates a pilot signal from the signal supplied from the reproduction amplifier 5, and supplies the separated pilot signal to an automatic gain control (AGC) circuit 9.

After the frequency demodulating circuit 8 demodulates the frequency-modulated luminance signal separated from the reproduced signal by the high-pass filter 6, a de-emphasis circuit 10 performs post-emphasis on the demodulated luminance signal, which is the reverse operation of the emphasis conducted during the recording, and supplies the resultant signal to a synchronizing signal separating circuit 11 and to a transmission path equalizing circuit 12.

The synchronizing signal separating circuit 11 separates a horizontal synchronizing signal H and a vertical synchronizing signal V affixed to the luminance signal supplied from the de-emphasis circuit 10, and supplies the separated signals to a memory controller 13. The transmission path equalizing circuit& 12 equalizes the luminance signal supplied from the de-emphasis circuit 10 to a waveform in which the luminance signal is to be present on the transmission path, and then supplies the waveform to an analog/digital (A/D) converter 14.

The pilot signal separated from the reproduced signal by the band-pass filter 7 is adjusted by the AGC circuit 9 in such a way that it has a fixed amplitude, and the resultant pilot signal is then supplied to one terminal of a multiplier 15.

The other terminal of the multiplier 15 is supplied with a signal obtained by frequency-dividing an oscillated signal, generated by a voltage controlled oscillator (VCO) 18 which oscillates at a frequency about 6 fsc by means of a 1/7 frequency divider 19 and by removing a high-frequency component from the signal having about 195 fH (fH means the horizontal scanning frequency) by means of a low-pass filter (LPF) 20. The multiplier 15 outputs a signal obtained by multiplying the pilot signal output from the AGC circuit 9 by the signal output from the LPF 20.

The signal output from the multiplier 15 is supplied to a LPF 16 where a signal is separated representing only a component proportionate to the sine component of the phase difference between the pilot signal output from the AGC circuit 9 and the signal output from the LPF 20. The signal is supplied to a loop filter 17.

The loop filter 17 is constructed by an integrator and other components, and has the function of determining the loop gain of a phase-locked loop (PIL) circuit constituted by the components 15 to 20. In consequence, the frequency of the signal output from the VCO 18 is controlled in accordance with the voltage of the signal output from the loop filter 17. The VCO 18 thus generates a signal having the same time base variations as those of the signal reproduced from the video floppy disk 1 and having a frequency of about 6 fsc (about 1365 fH), and supplies the generated signal to a phase shifter 21.

Figure 6:
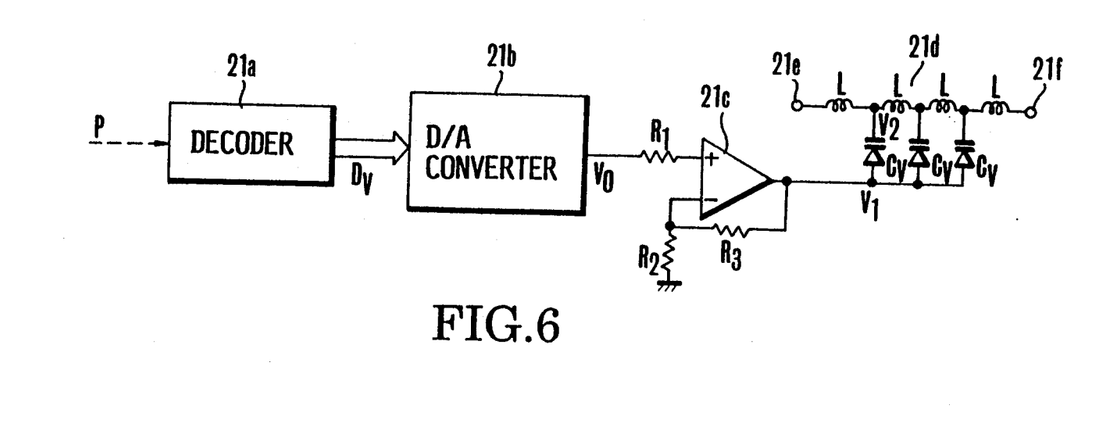
FIG. 6 shows an example of the configuration of a phase shifter employed in the reproducing apparatus of FIG. 5.

The phase shifter 21 shown in FIG. 5 may be constructed in the manner shown in FIG. 6.

In FIG. 6, the track designating signal P output from the system controller 22 is supplied to decoder 21a.

Figure 7:
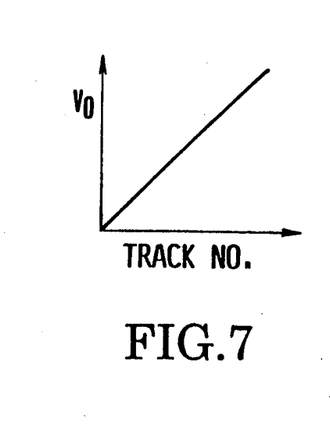
FIG. 7 shows the characteristics of a D/A converter of the phase shifter of FIG. 6.

The decoder 21a generates, for example, 6-bit voltage data Dv which corresponds to the track No. (from the first track to fiftieth track) designated by the track designating signal P supplied from the system controller 22, and supplies the generated voltage data Dv to a digital/analog (D/A) converter 21b to convert it into an analog voltage signal VO. The D/A converter 21b thus outputs a voltage signal VO which is proportional to the track No. designated by the trace designating signal P supplied from the system controller 22, as shown in FIG. 7.

The voltage signal VO, which is output from the D/A converter 21b, is amplified by an amplifier 21c to generate a voltage signal V1, and the generated voltage signal V1 is supplied to anode terminals of variable capacitors Cv constituting a variable delay line 21d. That is, the voltage signal supplied to the anode terminals of the variable capacitors Cv of the variable delay line 21d increases as the track Nc. designated by the track designating signal P supplied from the system controller 22 increases, i.e., as the designated track number approaches the innermost circumference track.

The VCO 18 is arranged to supply to the cathode terminals of the variable capacitors Cv constituting the variable delay line 21d the voltage signal V2 which is higher than the voltage signal V1 output from the amplifier 21c. In consequence, as the track No. designated by the track designating signal P increases, i.e., as the designated track number approaches the innermost circumference track, the voltage (V2−V1) between the terminals of the variable capacitor Cv decreases, thereby increasing the capacitance of the variable capacitors Cv and, hence, increasing the amount of delay of the variable delay line 21d.

The amount of delay of the variable delay line 21d can be varied by varying L, Cv and V2 in accordance with the voltage signal V1 output from the amplifier 21c.

The signal output from the VCO 18 shown in FIG. 5 and having 6 fsc is supplied to an input terminal 21e shown in FIG. 6, and is then delayed by the amount of delay which corresponds to the position of the track from which information is reproduced. The delayed signal is output from an output terminal 21f to the memory controller 13 and to the A/D converter 14 as a clock signal having the same time base variations as those of the reproduced signal.

As stated above, the luminance signal is supplied from the transmission path equalizing circuit 12 to the A/D converter 14. The A/D converter 14 thus converts the luminance signal supplied from the transmission path equalizing circuit 12 into a digital signal by using the clock signal output form the phase shifter 21. and supplies the digital signal to a memory 23.

Figure 8:
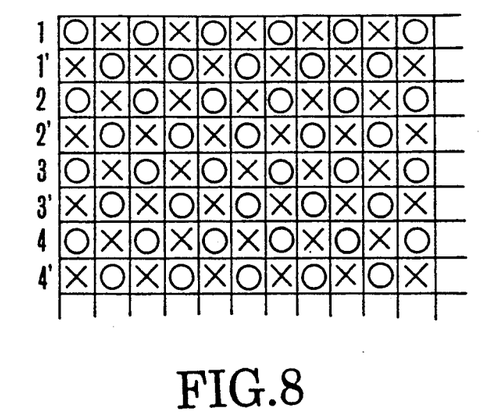
FIG. 8 shows the positional relation between recorded pixels and interpolated pixels in the electronic still video system.

The memory controller 13 controls the writing operation of the image signal into the memory 23 in accordance with the clock signal supplied from the phase shifter 21, and thereby stores the digitized luminance signal supplied from the A/D converter 4 in the memory 23. Once the memory controller 13 has stored the luminance signal corresponding to one picture, i.e., that recorded on the four recording tracks on the video floppy disk 1, in the memory 23 and has completed the storage operation, it controls an interpolating circuit 24 and thereby generates an interpolated luminance signal in which the portion which is not recorded on the video floppy disk 1 (the pixels indicated by >: in FIG. 8) is interpolated by using the luminance signal stored in the memory 23. The generated interpolated luminance signal is also stored in the memory 23.

Once the luminance signal reproduced from the video floppy disk 1 and the interpolated luminance signal generated by the interpolating circuit 24 have been stored in the memory 23, the memory controller 13 reads out the luminance signal stored in the memory 23 by a precise clock signal supplied from a clock oscillator 25 on which no time base variations are generated, and supplies the read-out signal to a D/A converter 26.

The luminance signal supplied from the memory 23 to the D/A converter 26 is converted into an analog signal by means of the clock signal generated by the clock oscillator 25, and is then output from an output terminal 27 as a luminance signal in which no time base variations are generated.

As will be understood from the foregoing description, in the present embodiment, the clock signal, whose phase is synchronized with that of the pilot signal reproduced from a reproduction track selected from the plurality of tracks on the video floppy disk 1, is delayed in accordance with the position of that track to synchronize the clock signal with the luminance signal reproduced from that track. The luminance signal reproduced from the reproduction track is stored in the memory in accordance with the delayed clock signal. In consequence, the reproduced luminance signal can be sampled and stored in the memory in the same timing as that in which it is sampled during recording without being affected by the phase difference between the reproduced luminance signal and the reproduced pilot signal, which varies depending on the position of the reproduction track. It is, therefore, possible to accurately restore an original image signal regardless of the position of the track on the video floppy disk from which the image signal is reproduced.

In the above-described embodiment, the phase shifter 21 shown in FIG. 5 has the configuration shown in FIG. 6. However, in a case where the phase difference between the reproduced luminance signal and the reproduced pilot signal does not vary much depending on the position of the reproduction track, it may also be constructed in the manner shown in FIG. 9.

Figure 9:
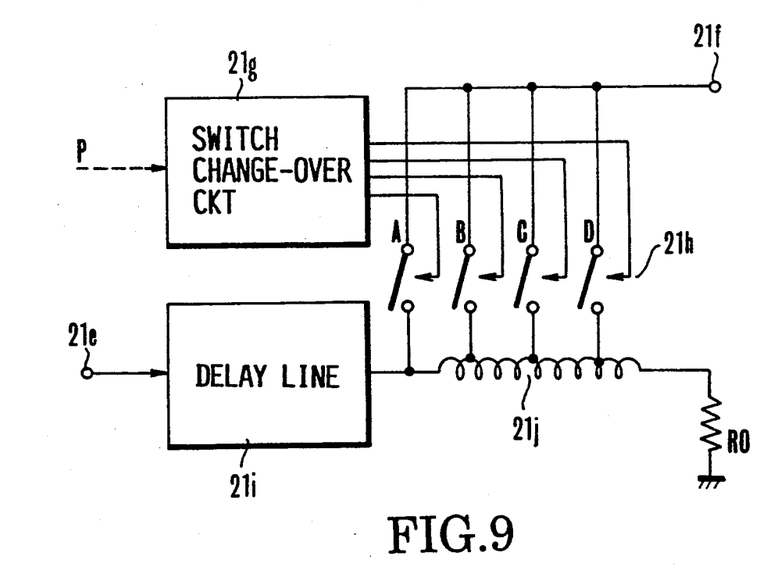
FIG. 9 shows another example of the configuration of the phase shifter employed in the reproducing apparatus of FIG. 5.

The phase shifter shown in FIG. 9 includes a switch change-over circuit 21g, a switch 21h, a fixed delay line 21i, and a tap type variable delay line 21j, and is designed to vary the amount of delay of the signal of 6 fsc output from the VCO 18 shown in FIG. 5 stepwise in accordance with the position of a track from which information is reproduced.

The track designating signal P output from the system controller 22 is supplied to the switch control circuit 21g, as shown in FIG. 9. The switch control circuit 21g connects only A of the switch circuit 21h when the track designating signal P designates a track between the first and ninth tracks, only B in the switch circuit 21h when the track designating signal P designates a track between the tenth and twenty-fifth tracks, only C in the switch circuit 21h when the track designating signal P designates a track between the twenty-sixth and thirty-fifth tracks, and only D in the switch circuit 21h when the track designating signal P designates a track between the thirty-sixth and fiftieth tracks.

The signal of 6 fsc, which is supplied to an input terminal 21e from the VCO 18 shown in FIG. 5, is delayed by the fixed delay line 21i, and then supplied to A of the switch circuit 21h and to the variable delay line 21j. The outputs of the individual taps of the variable delay line 21j are supplied to B, C and D of the switch circuit 21h. By controlling connection of the switch circuit 21h by means of the switch control circuit 21g in the manner described above, a clock signal whose time base is delayed stepwise in accordance with the position of the track from which the image signal reproduced is output from an output terminal 21f.

As can be clear from the above description, in this embodiment, the clock signal is delayed stepwise in accordance with the position of a track from which the image signal is reproduced to synchronize the clock signal with the luminance signal reproduced from that track, and the luminance signal reproduced from that track is stored in the memory in accordance with the delayed clock signal. In consequence, the reproduced luminance signal can be sampled and stored in the memory in the same timing as that in which it is sampled during recording without being affected by the phase difference between the reproduced luminance signal and the reproduced pilot signal which differs depending on the position of the reproduction track. It is, therefore, possible to accurately restore an original signal regardless of the position of the reproduction track on the video floppy disk.

As stated above, in the above-described embodiment, it is possible to precisely restore an original image signal from the signal reproduced form each recording track formed on a disk-shaped recording medium.

Figure 10:
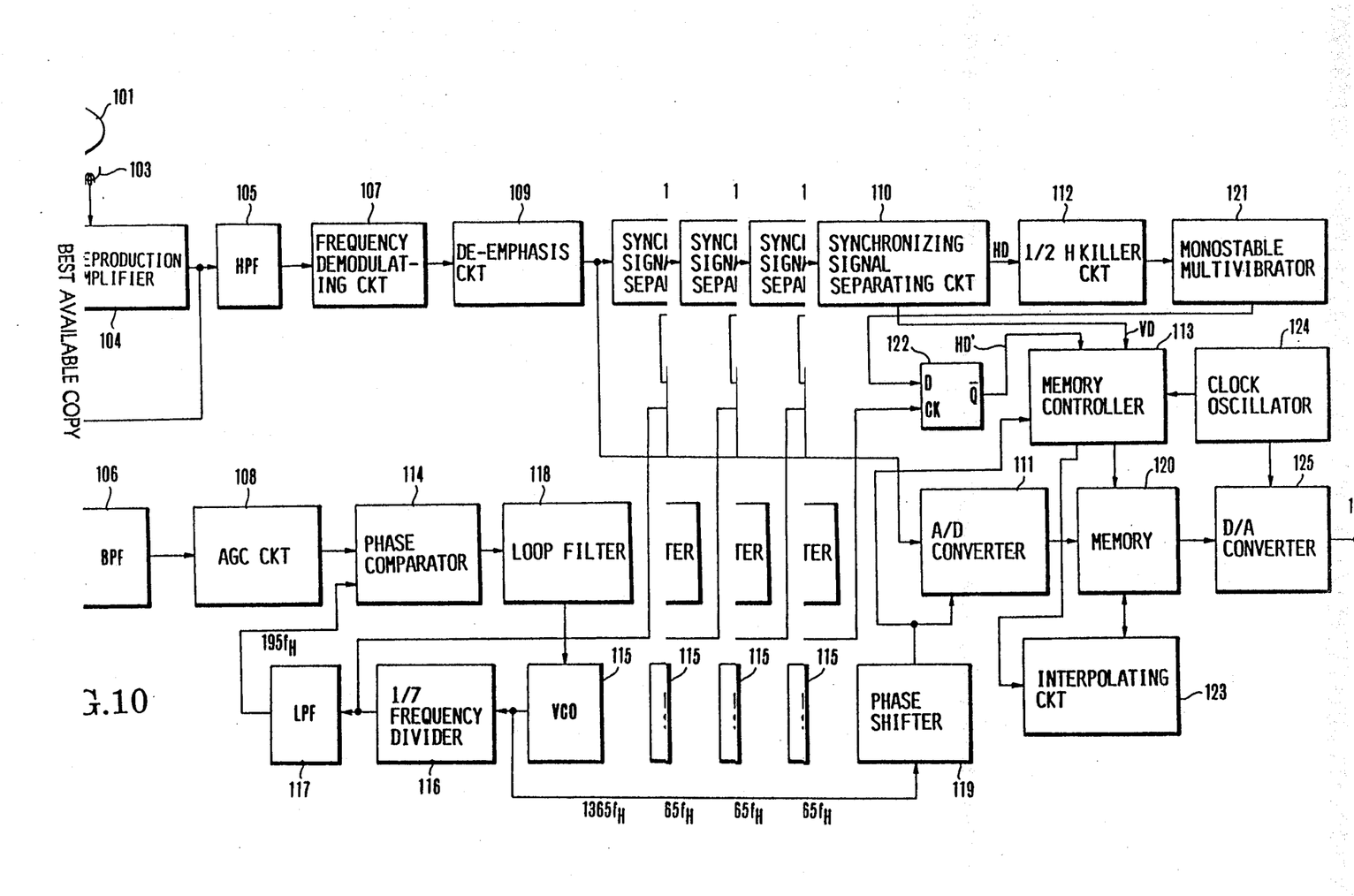
FIG. 10 is a reproducing apparatus for the electronic still video system to which the present invention is applied, showing a second embodiment of the present invention.

FIG. 10 is a schematic view of a reproducing apparatus of an electronic still video system to which the present invention is applied, showing a second embodiment of the present invention. To simplify the explanation, only a luminance signal processing system is shown in FIG. 10, description of a color signal processing system being omitted.

In FIG. 10, reference numeral 101 denotes a video floppy disk on which fifty recording tracks are formed in a concentric fashion. On these fifty recording tracks, image signals, with which pilot signals are multiplexed in the manner shown in FIG. 3, are recorded in a track pattern shown in FIG. 2. The image signals are transmitted in four fields to form a single picture. The video floppy disk 101 is rotated for reproduction by a motor 102 at a speed of 1/60 sec per rotation.

When a desired track from which information is reproduced is designated by operating an operation unit (not shown), a head moving mechanism (not shown) moves a magnetic head 103 to a track designated by the operation unit. The magnetic head 103 reproduces a signal recorded on the designated track and supplies the reproduced signal to a reproduction amplifier 104.

The reproduction amplifier 104 amplifies the signal reproduced by the magnetic head 103, and supplies the amplified signal to a high-pass filter (HPF) 105 and to a band-pass filter (BPF) 106.

The high-pass filter 105 separates a frequency-modulated luminance signal from the signal supplied from the reproduction amplifier 104, and supplies the separated frequency-modulated luminance signal to a frequency demodulating circuit 107. The band-pass filter 106 separates a pilot signal from the signal supplied from the reproduction amplifier 104, and supplies the separated pilot signal to an automatic gain control (AGC) circuit 108.

After the frequency demodulating circuit 107 demodulates the frequency-modulated luminance signal separated from the reproduced signal by the high-pass filter 105, a de-emphasis circuit 109 performs on the demodulated luminance a post-emphasis, which is the reverse operation of the pre-emphasis conducted during recording, and supplies the resultant signal to a synchronizing signal separating circuit 110 and to an A/D converter 111.

The synchronizing signal separating circuit 110 separates a horizontal synchronizing signal HD and a vertical synchronizing signal VD affixed to the luminance signal supplied from the de-emphasis circuit 109, and supplies the separated signal HD signal to a ½ H killer circuit 112 and the separated signal VD signal to a memory controller 113.

The pilot signal separated frog the reproduced signal by the band-pass filter 106 is adjusted by the AGC circuit 108 in such a way that it has a fixed amplitude, and the resultant pilot signal is then supplied to one terminal of a phase comparator 114.

The other terminal of the phase comparator 114 is supplied with a signal obtained by frequency-dividing an oscillated signal, generated by a voltage controlled oscillator (VCO) 115 which oscillates at a frequency about 6 fsc by means of a 1/7 frequency divider 116, and then by removing a high-frequency component from the signal having about 195 fH (fH means the horizontal scanning frequency) by means of a low-pass filter (LPF) 117. The phase comparator 114 outputs a signal which corresponds to a phase difference between the pilot signal output from the AGC circuit 108 and the signal output from the LPF 117.

The signal output from the phase comparator 114 is supplied to a loop filter 118 which has the function of determining the loop gain of a phase-looked loop (PLL) circuit constituted by the components 114 to 118. In consequence, the frequency cf the oscillated signal output from the VCO 115 is controlled in accordance with the voltage of the signal output from the loop filter 118, and the VCO 115 thus generates a signal having the same time base variations as those of the signal reproduced from the video floppy disk 101 and having a frequency of about 6 fsc (about 1365 fH), and supplies the generated signal to a phase shifter 119. The phase shifter 119 delays the clock signal generated by the VCO 115 in accordance with the position of the track on the video floppy disk 101 from which information is reproduced so as to achieve sampling which is conducted in the same timing. The timing would otherwise vary in accordance with the track position due to the phase difference between the reproduced luminance signal and the reproduced pilot signal which varies in accordance with the track position. The clock signal, which is delayed by the phase shifter 119 in accordance with the position of the track from which the image signal is reproduced, is supplied to an A/D converter 111 and to a memory controller 113.

As stated above, the luminance signal is supplied from the de-emphasis circuit 109 to the A/D converter 111. The A/D converter 111 thus converts the luminance signal supplied from the de-emphasis circuit 109 into a digital signal by using the clock signal output from the phase shifter 119, and supplies the digital signal to a memory 120. The memory controller 113 controls the writing operation of the image signal into the memory 120, and thereby stores the digitized luminance signal supplied from the A/D converter 111 in the memory 120.

As stated above, the horizontal synchronizing signal HD, which is separated from the reproduced luminance signal by the synchronizing signal separating circuit 110, is supplied to the ½ H killer circuit 112. The ½ H killer circuit 112 removes an equalizing pulse from the horizontal synchronizing signal HD, and supplies a horizontal synchronizing signal from which the equalizing pulse is removed (See FIG. 11(a)) to a monostable multivibrator 121.

Figure 11A:
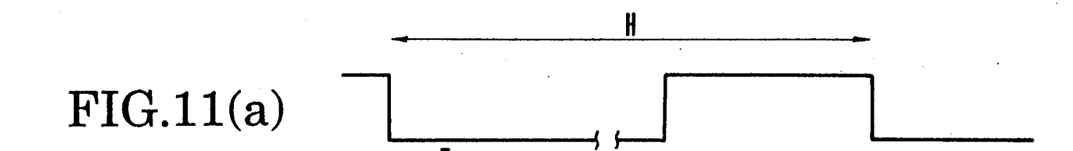
FIGS. 11(a), 11(b), 11(c) and 11(d) are timing charts of part of signals employed in the reproducing apparatus of FIG. 10.
Figure 11B:
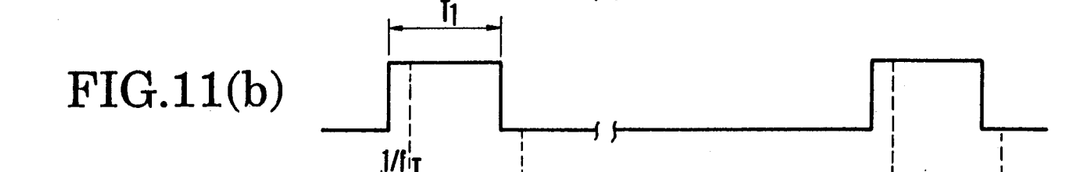
Figure 11C:
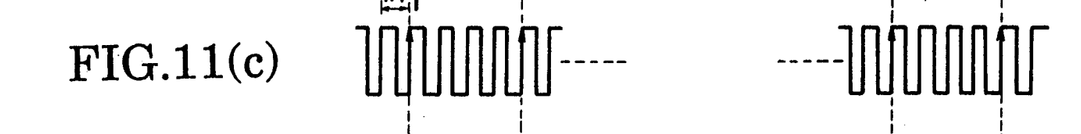

The monostable multivibrator 121 generates a pulse signal (see FIG. 11(b)) having a pulse duration of T1, which begins with the drop of the horizontal synchronizing signal shown in FIG. 11(a) from which the equalizing pulse is removed. T1 is set to a value which is longer than the frequency of the pilot signal, $1/f_T = 1/195\, f_H$, and which is long enough to reset the memory 120. The pulse signal output from the monostable multivibrator 121 is supplied to a data terminal (indicated by D in FIG. 10) of a D flip-flop 122, while the clock signal (see FIG. 11(c),) which is generated by the VCO 115, and which is frequency-divided by the 1/7 frequency divider 117, and whose phase is synchronized with that of the reproduced pilot signal, is supplied to a clock terminal (indicated by CK in FIG. 10) of the D flip-flop 122. The D flip-flop 122 latches the pulse signal shown in FIG. 11(b) by the rises (indicated by the arrows in FIG. 10) of the clock signal shown in FIG. 11(c), and outputs from its output terminal (indicated by Q in FIG. 10) to the memory controller 113 a pseudo horizontal synchronizing signal HD' shown in FIG. 11(d).

Figure 11D:
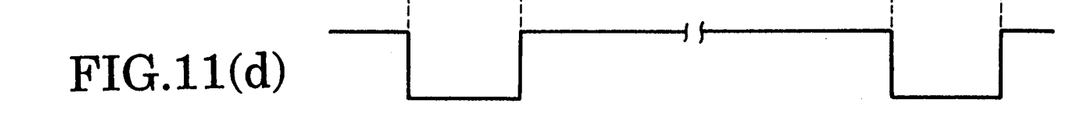

The thus-generated pseudo horizontal synchronizing signal HD' is the signal whose phase is synchronized with that of the clock signal generated by the VCO 115 and whose edge portions are not deteriorated.

The memory controller 113 generates a writing address which is designated to the memory 120 by using the pseudo horizontal synchronizing signal HD' output from the D flip-flop 122 and the vertical synchronizing signal VD separated by the synchronizing signal separating circuit 110, and stores the digital luminance signal output from the A/D converter 111 into the memory 120 in synchronism with the clock signal output from the phase shifter 119.

Once the memory controller 113 has stored the luminance signal corresponding to one picture, i.e., that recorded on the four recording tracks on the video floppy disk 101 (pixels indicated by χ FIG. 8), in the memory 120 and has thereby completed the storage operation, it controls an interpolating circuit 123 and thereby generates an interpolated luminance signal in which the portion not recorded on the video floppy disk 101 (the pixels indicated by x in FIG. 8) is interpolated by using the luminance signal stored in the memory 120. The generated interpolated luminance signal is also stored in the memory 120.

Once the luminance signal reproduced from the video floppy disk 101 and the interpolated luminance signal generated by the interpolating circuit 123 have been stored in the memory 120, the memory controller 113 reads out the luminance signal stored in the memory 120 by a precise clock signal supplied from a clock oscillator 124 in which no time base variations are generated, and supplies the read-out signal to a D/A converter 125.

The luminance signal supplied from the memory 120 to the D/A converter 125 is converted into an analog signal by means of the clock signal generated by the clock oscillator 124, and is then output from an output terminal 126 as a luminance signal in which no time base variations are generated.

As will be understood from the foregoing description, in the present embodiment, the luminance signal reproduced from the video floppy disk is temporarily stored in the memory in synchronism with the clock signal, which contains the time base variations generated during reproduction, a luminance signal corresponding to one picture is reconstructed in the memory, and the luminance signal stored in the memory is read out in synchronism with the precise clock signal in which no time base variations are generated. When the time base variations generated on the reproduced luminance signal are removed during reproduction, the address in the memory is not set by using the horizontal synchronizing signal separated from the reproduced luminance signal, but rather by using a pseudo horizontal synchronizing signal generated in synchronism with the clock signal synchronized with the reproduced pilot signal. As a result, a luminance signal in which no time base variations are generated can be restored with a high degree of accuracy.

In this embodiment, the reproducing apparatus including the luminance signal processing system has been described. However, the present invention is also applicable to an apparatus which also includes a color signal processing system.

As stated above, in the above-described embodiment, it is possible to precisely restore an original image signal from the signal recorded on the recording medium.

What is claimed is:

1. An image signal reproducing apparatus for reproducing an image signal from a disk-shaped recording medium on which the image signal with which a pilot signal is frequency-multiplexed is recorded, comprising:
    (a) reproducing position designating means for designating any desired reproducing position on said disk-shaped recording medium;
    (b) reproduction means for reproducing the image signal with which the pilot signal is frequency-multiplexed, recorded at the reproducing position designated by said reproducing position designating means on said disk-shaped recording medium and for outputting the reproduced image signal and the reproduced pilot signal;
    (C) memory means for storing the reproduced image signal output from said reproduction means;
    (D) clock signal generating means for generating a clock signal synchronized in phase with the reproduced pilot signal output from said reproduction means; and
    (E) clock signal correction means for correcting the phase of said clock signal generated by said clock signal generating means in accordance with the reproducing position on said disk-shaped recording medium designated by said reproducing position designating means.

2. An image signal reproducing apparatus according to claim 1, wherein said memory includes a memory circuit for storing the image signal reproduced from the recording medium by said reproduction means, and a memory control circuit for controlling an operation of storing the reproduced image signal in said memory circuit in accordance with the clock signal phase-corrected by said clock signal correction means.

3. An image signal reproducing apparatus according to claim 2, wherein said memory means further includes a synchronizing signal separating circuit for separating a synchronizing signal from the reproduced image signal output from said reproduction means and for outputting the separated synchronizing signal, said control circuit controlling the operation of storing the reproduced image signal in said memory circuit in accordance with the synchronizing signal output from said synchronizing signal separating circuit and the clock signal phase-corrected by said clock signal correction means.

4. An image signal reproducing apparatus according to claim 2, wherein said memory control circuit is arranged to read out the reproduced image signal from said memory means in which the reproduced image signal is stored in in synchronized relation with a precise clock signal.

5. An image signal reproducing apparatus for reproducing an image signal from a recording medium on which the image signal with which a pilot signal is frequency-multiplexed is recorded, comprising:
    (A) memory means for storing the image signal reproduced from the recording medium;
    (B) clock signal generating means for generating a clock signal which is synchronized in phase with the reproduced pilot signal reproduced from the recording medium;
    (C) synchronizing signal separation means for separating a synchronizing signal from the reproduced image signal reproduced from the recording medium and for outputting the separated synchronizing signal;
    (D) synchronizing signal correcting means for correcting the synchronizing signal output from said synchronizing signal separation means in accordance with the clock signal generated by said clock signal generating means and for outputting the corrected synchronizing signal; and
    (E) control means for controlling an operation of storing the reproduced image signal by said memory means in accordance with the clock signal generated by said clock signal generating means and the corrected synchronizing signal output from said synchronizing signal correcting means.

6. An image signal reproducing apparatus according to claim 5, wherein said memory means includes a memory circuit for storing the reproduced image signal.

7. An image signal reproducing apparatus according to claim 6, wherein said control means includes a memory control circuit for successively assigning writing addresses of the reproduced image signal in said memory circuit in accordance with the clock signal generated by said clock signal generating means, said memory control circuit being arranged to reset the writing addressed assigned to said memory circuit in accordance with the synchronizing signal output from said synchronizing signal correcting means.

8. An image signal reproducing apparatus according to claim 5, wherein said control means is arranged to read out the reproduced image signal stored in said memory means in synchronism with a precise clock signal.

* * * * *

UNITED STATES PATENT AND TRADEMARK OFFICE
CERTIFICATE OF CORRECTION

PATENT NO.   : 5,212,562
DATED        : May 18, 1993
INVENTOR(S)  : Tokihiko Ogura It is certified that error appears in the above-identified patent and that said Letters Patent is hereby corrected as shown below: On the title page:

[ITEM 57], line 4.   After "signal" insert -- . --
Col. 1, line 20.   Change "of" to -- or --
Col. 1, line 26.   Change "NISC" to -- NTSC --
Col. 1, line 54.   Change "abovede-" to -- above de- --
Col. 1, line 68.   Change "s) .stem," to -- system --
Col. 2, line 23.   Change "wi&h" to -- with --
Col. 2, line 41.   Change "varies" to -- varying --
Col. 2, line 67.   Change "that" to -- the --
Col. 3, line 22.   Change ";" to -- , --
Col. 3, line 44.   After "pilot signal" insert -- . --
Col. 3, line 51.   Change "form" to -- from --
Col. 4, line 28.   Change "part" to -- parts --
Col. 5, line 20.   Change "circuit&" to -- circuits --
Col. 5, line 34.   After "19" insert -- , --
Col. 5, line 42.   Change "a" to -- the --
Col. 5, line 46.   After "The" insert -- separated --
Col. 5, line 64.   Change "No." to -- number --
Col. 6, line 3.   Change "trace" to -- track --
Col. 6, lines 13 and 21, change "No." to --number --.
Col. 6, line 61.   Change ">:" to -- x --
Col. 8, line 10.   Change "&he" to -- the --
Col. 8, line 22.   Change "form" to -- from --

UNITED STATES PATENT AND TRADEMARK OFFICE
CERTIFICATE OF CORRECTION

PATENT NO. : 5,212,562

DATED : May 18, 1993

INVENTOR(S) : Tokihiko Ogura

It is certified that error appears in the above-identified patent and that said Letters Patent is hereby corrected as shown below:

Col. 9, lines 5, 6.  Delete "signal" first instance

Col. 9, line 8.  Change "frog" to -- from --

Col. 9, line 27.  Change "looked" to -- locked --

Col. 9, line 41.  Delete "which is"

Col. 10, line 14.  Change "115," to -- 115 and --

Col. 10, line 41.  Change "x" to -- o --

Col. 12, line 54.  Change "addressed" to -- addresses --

Signed and Sealed this

Twenty-eighth Day of December, 1993

Attest:

BRUCE LEHMAN

*Attesting Officer*   *Commissioner of Patents and Trademarks*